United States Patent
Nelson et al.

Patent Number: 5,937,422
Date of Patent: Aug. 10, 1999

[54] AUTOMATICALLY GENERATING A TOPIC DESCRIPTION FOR TEXT AND SEARCHING AND SORTING TEXT BY TOPIC USING THE SAME

[75] Inventors: Douglas J. Nelson, Columbia; Patrick John Schone, Elkridge; Richard Michael Bates, Greenbelt, all of Md.

[73] Assignee: The United States of America as represented by the National Security Agency, Washington, D.C.

[21] Appl. No.: 08/834,263

[22] Filed: Apr. 15, 1997

[51] Int. Cl.$^6$ .................................................... G06F 17/30
[52] U.S. Cl. ............................ 707/531; 707/4; 707/532; 707/535; 707/512
[58] Field of Search .......................... 704/10; 707/512, 707/532, 535, 531, 3–5, 7

[56] References Cited

U.S. PATENT DOCUMENTS

| | | | |
|---|---|---|---|
| 4,965,763 | 10/1990 | Zamora | 704/1 |
| 5,371,673 | 12/1994 | Fan | 704/1 |
| 5,384,703 | 1/1995 | Withgott et al. | 707/531 |
| 5,434,962 | 7/1995 | Kyojima et al. | 707/531 |
| 5,619,410 | 4/1997 | Emori et al. | 704/7 |
| 5,845,278 | 12/1998 | Kirsch et al. | 707/3 |
| 5,873,660 | 2/1999 | Walsh et al. | 400/63 |

*Primary Examiner*—Wayne Amsbury
*Assistant Examiner*—Srirama Channavajjala
*Attorney, Agent, or Firm*—Robert D. Morelli

[57] ABSTRACT

A method of automatically generating a topical description of text by receiving the text containing input words; stemming each input word to its root form; assigning a user-definable part-of-speech score to each input word; assigning a language salience score to each input word; assigning an input-word score to each input word; creating a tree structure under each input word, where each tree structure contains the definition of the corresponding input word; assigning a definition-word score to each definition word; collapsing each tree structure to a corresponding tree-word list; assigning a tree-word-list score to each entry in each tree-word list; combining the tree-word lists into a final word list; assigning each word in the final word list a final-word-list score; and choosing the top N scoring words in the final word list as the topic description of the input text. Document searching and sorting may be accomplished by performing the method described above on each document in a database and then comparing the similarity of the resulting topical descriptions.

31 Claims, 4 Drawing Sheets

INPUT TEXT = DOG, WOLF fmax=80521, T=23.6546, e=0.05, dmax=280, de=4.09, P=1

<u>DOG (B=1, f=1489, S=4.4365, A=4.4365)</u>

CARNIVEROUS (B=0.6, f=58, S=8.13, d=20, D=2.7796, R=0.207, W=0.5, A=0.46)

DOMESTICATE (B=0.9, f=1933, S=4.05, d=23, D=2.864, R=0.2137, W=0.5, A=0.474)

MAMMAL (B=0.9, f=159, S=8.13, d=162, D=1.898, R=0.1416, W=0.5, A=0.314)
OF (B=0, f=x, S=x, d=x, D=x, R=x, W=x, A=0), where x=don't care
THE (B=0, f=x, S=x, d=x, D=x, R=x, W=x, A=0)
CANINES (B=1, f=500, S=8.13, d=2, D=5.86, R=0.437, W=0.5, A=0.97)

<u>WOLF (B=1, f=975, S=log(80521/(975-23.6^2+23.6))=5.21, A=5.21)</u>
BLOOD-THIRSTY (B=0.9, f=63, S=8.13, d=27, D=3.9253, R=0.2313, W=0.5, A=0.603)
CARNIVEROUS (B=0.6, f=58, S=8.13, d=20, D=2.7796, R=0.1638, W=0.5, A=0.427)

MAMMAL (B=0.9, f=159, S=8.13, d=162, D=1.898, R=0.1119, W=0.5, A=0.291)
SIMILAR (B=0.6, f=1179, S=4.62, d=346, D=x, R=x, W=x, A=0)
TO (B=0, f=x, S=x, d=x, D=x, R=x, W=x, A=0)
A (B=0, f=x, S=x, d=x, D=x, R=x, W=x, A=0)
BIG (B=0.6, f=26605, S=1.127, d=545, D=x, R=x, W=0.5, A=0.46)
DOG (B=1, f=1489, S=4.437, d=68, D=2.506, R=0.148, W=0.5, A=0.385)
OF (B=0, f=x, S=x, d=x, D=x, R=x, W=x, A=0)
THE (B=0, f=x, S=x, d=x, D=x, R=x, W=x, A=0)
CANINE (B=1, f=500, S=8.13, d=2, D=5.86, R=0.345, W=0.5, A=0.900)

FIG. 4

TREE-WORD LIST #1

CANINE, 0.97

CARNIVEROUS, 0.46

DOG, 4.4365

DOMESTICATE, 0.474

MAMMAL, 0.314

TREE-WORD LIST #2

BLOOD-THIRSTY, 0.603

CANINE, 0.9

CARNIVEROUS, 0.427

DOG, 0.385

MAMMAL, 0.291

WOLF, 5.21

FIG. 5

FINAL WORD LIST

CANINE, 9.649

DOG, 5.22

WOLF, 5.21

CARNIVEROUS, 2.29

MAMMAL, 1.096

BLOOD-THIRSTY, 0.603

DOMESTICATE, 0.474

FIG. 6

AUTOMATICALLY GENERATING A TOPIC DESCRIPTION FOR TEXT AND SEARCHING AND SORTING TEXT BY TOPIC USING THE SAME

FIELD OF THE INVENTION

This invention relates to information processing and, more particularly, to automatically generating a topic description for text and searching and sorting text by topic using the same.

BACKGROUND OF THE INVENTION

Identifying topics of text has been an area of study for several years, and identifying such in unconstrained speech has been an area of growing interest. The latter of these two areas, however, seems to be more difficult since much of the information conveyed in speech is never actually spoken and since utterances frequently are less coherent than written language.

The standard method of electronically searching for a document related to a particular topic is by using keywords. In a keyword search, a user selects a small set of words (i.e., the keywords) which may be expected to occur in documents related to the topic of interest. The documents are then searched for occurrences of the keywords. Documents containing the keywords are then presented to the user. A disadvantage of this method is that relevant documents that do not include the keywords will not be retrieved.

The keyword search method has been improved by the inclusion of Boolean operations. In 1847 George Boole developed the fundamental ideas of using mathematical symbols and operations to represent statements and to solve problems in logic. Boolean operations include "and", "or", etc. The user may use Boolean operators in conjunction with keywords to search for documents containing the keywords and the relationship established between the keywords by the Boolean operator (e.g., keyword1 "and" keyword2).

A further improvement to the keyword search is the use of "stemming." Stemming, or truncated stemming, is the process of shortening a keyword by removing one or more letters from the end of the keyword or identifying a keyword with a linguistic baseform word. Each unique modification of a keyword is called a "stem." A keyword may have more that one stem. By using stemming, the user searches for documents containing either the keyword or the stems of the keyword. The disadvantage of truncated stemming is that a stem may not have the same meaning as the keyword because a stem may not be a true base form, or root, of the keyword. For example, the truncated stems of the word "carpet" include the words "car", "carp", and "carpe." The first two stems have a different meaning than the keyword and the third stem may be confused with a word in a different language.

A variant of stemming is the use of "N-grams." An N-gram of a keyword is a sequence of consecutive keyword characters having length "N." A keyword may result in more than one N-gram. The list of N-grams is generated by sliding an N-long window through the keyword one character location at a time and recording the N-gram contained in the window at each slide position. For example, the word "carpet" has the following 3-grams "car", "arp", "rpe", and "pet." The N-grams generated from the keywords are then used to search for other documents containing the N-grams. N-grams may be used on multiple keywords or a section of text. N-gram statistics (e.g., N-gram type and frequency) are obtained for the query document (e.g., keywords or text) and the documents being searched. Search documents that statistically similar to the query document are returned. The disadvantage of this method is that it cannot be used to generate a topical description of a document or return documents that use different words to discuss the topic of interest.

A further improvement to keyword searching is the inclusion of training. Training may take the form of rules for determining the context of words. That is, the context of keywords in a query may be determined so that documents containing the keywords in the same context as the query are returned while documents that do not contain the keywords and documents that contain the keywords in a different context from the query are ignored. The disadvantage of this method is that it requires human intervention to establish the rules and is not fully automatic.

U.S. Pat. Nos. 5,265,065, entitled "METHOD AND APPARATUS FOR INFORMATION RETRIEVAL FROM A DATABASE BY REPLACING DOMAIN SPECIFIC STEMMED PHASES IN A NATURAL LANGUAGE TO CREATE A SEARCH QUERY," and 5,418,948, entitled "CONCEPT MATCHING OF NATURAL LANGUAGE QUERIES WITH A DATABASE OF DOCUMENT CONCEPTS," discloses a method of automatically generating a search query from a user generated natural language input by parsing the input, removing stop words, stemming the remaining words, and combining those words that are commonly collocated. U.S. Pat. Nos. 5,265,065 and 5,418,948 do not disclose a method of automatically generating a topic description for text and searching and sorting text by topic using the same as does the present invention. U.S. Pat. Nos. 5,265,065 and 5,418,948 are hereby incorporated by reference into the specification of the present invention.

U.S. Pat. No. 5,369,577, entitled "TEXT SEARCHING SYSTEM," discloses a method of searching text where a user provides a first word, the method automatically generates a series of words that are lexically related to the first word, and searches a collection of words to detect the occurrence of any of the words that were automatically generated. U.S. Pat. No. 5,369,577 does not disclose a method of automatically generating a topic description for text and searching and sorting text by topic using the same as does the present invention. U.S. Pat. No. 5,369,577 is hereby incorporated by reference into the specification of the present invention.

U.S. Pat. No. 5,440,481, entitled "SYSTEM AND METHOD FOR DATABASE TOMOGRAPHY," discloses a method of identifying word phrases by counting phrases of any length in the text, sorting the phrases by frequency of occurrence, sorting the phrases, and selecting those phrases that are above a user-definable threshold. U.S. Pat. No. 5,440,481 does not disclose a method of automatically generating a topic description for text and searching and sorting text by topic using the same as does the present invention. U.S. Pat. No. 5,440,481 is hereby incorporated by reference into the specification of the present invention.

U.S. Pat. No. 5,576,954, entitled "PROCESS FOR DETERMINATION OF TEXT RELEVANCY," discloses a method of document retrieval by determining the meaning of each word in a query and each word in the documents, making adjustments for words in the query that are not in the documents, calculating weights for the semantic components in the query and in the documents, multiplying the weights together, adding the products to determine a real value number for each document, and sorting the documents in sequential order. U.S. Pat. No. 5,576,954 does not disclose a method of automatically generating a topic description for text and searching and sorting text by topic using the same as does the present invention. U.S. Pat. No. 5,576,954 is hereby incorporated by reference into the specification of the present invention.

SUMMARY OF THE INVENTION

It is an object of the present invention to automatically generate a topic description for a document that may include words that do not appear in the document.

It is another object of the present invention to automatically generate a topic description for a document, where the document is text of any length, where the text may be derived from speech, and where the text may be in any language.

It is another object of the present invention to automatically generate a topic description for a document and search for other documents that concern the same topic description.

It is another object of the present invention to automatically generate a topic description for a document and sort documents by their topic description.

The objects of the present invention are achieved by the following method. First, a document is received. The document must be in the form of text, but the text may be derived from any source (e.g., machine transcribed speech, optical character reader, text generated from news wire, etc.).

Second, each word in the document is linguistically stemmed to its root form (i.e., singular noun form or verb infinitive form).

Third, a part-of-speech score $\beta_i$ is assigned to each unique word $w_i$ in the document.

Fourth, each unique word $w_i$ in the document is assigned a language salience score $S_i$.

Fifth, each unique word $w_i$ in the document is assigned an initial score $A_{i,o}$ that is a function of its part-of-speech score $\beta_i$, its language salience score $S_i$, and the number of times the word $w_i$ appears in the document.

The term "dictionary" includes any item that enables a user to look-up a word and get one or more related words or concepts (e.g., dictionary, thesaurus, encyclopedia, etc.). Therefore, the definition of the word $w_i$ is one or more related words derived from either a dictionary, a thesaurus, an encyclopedia, and so on.

Sixth, a tree structure is created under each unique word $w_i$ in the document, where the tree structure contains the definition of each word $w_i$ contained therein. Each word in the tree structure (i.e., the definitions of each word $w_i$ contained therein) may have connected to it a further tree structure containing its definition. The tree may be expanded, where the user may define the number of tree structure levels.

Seventh, each definition word $w_{i,j}$ or $w_j$ in each tree structure level is assigned a score $A_{i,t}[j]$, where t indicates the level of the tree structure, based on its part-of-speech score $\beta_j$, the language salience score of the word it defines, a relational salience score $R_{k,j}$ which is used to determine the portion of the score of word $w_k$ which is imparted to word $W_j$ as word $w_k$ is expanded in the formation of the tree structure, and a user-definable factor $W_{i,t}$ for setting the percentage of the language salience score of the word being defined that will be distributed amongst the definitional words in the tree structure.

The relational salience $R_{i,j}$ score of a definitional word is a function of the dictionary salience score $D_{i,t}$ of the definitional word and the dictionary salience scores of the other words in the corresponding definition (e.g., $R_{i,j}=D_{i,j}/\Sigma D_{i,k}$). The dictionary salience is an estimate of the relative importance of the word within the dictionary. For example, a word $w_{1,0}$ may be defined by the words $w_{1,1}$, $w_{1,2}$, $w_{1,3}$, and $w_{1,4}$. These definitional words may have dictionary salience scores $D_{1,1}$, $D_{1,2}$, $D_{1,3}$, and $D_{1,4}$, respectively. The relational salience score $R_{1,1}$ of definitional word $w_{1,1}$, may be $R_{1,1}=D_{1,1}/(D_{1,1}+D_{1,2}+D_{1,4})$.

Eighth, for each word in the text, the entire tree structure is collapsed to form a single temporary word list under each input text word, where each temporary word list contains each unique word contained in the corresponding tree structure. Note that there is no interaction between the tree structures yet. Each entry in each temporary word list is assigned a tree score that is a function of the scores of the multiple versions of that word that may have existed in the corresponding uncollapsed tree structure. That is, if a word $w_i$ exists in various locations in a particular tree structure with scores $A_{i,j1}$, $A_{i,j1}$, . . . , $A_{i,jn}$, then the collapsed temporary word list corresponding to that particular uncollapsed tree structure will include one instance of the word with a single tree score $A_{i,tr}$ that is based on the various scores recorded for the word in the corresponding uncollapsed tree structure.

Ninth, the temporary list for each of the words in the input text are combined into a single final list in order to rank order the unique words of the lists according to a final score $A_{f,i}$. The final list may include words from the text and words from a definition. Each final list entry is assigned a final score $A_{f,i}$ that is a function of its dictionary salience, language salience, and the tree scores.

Tenth, the top N scoring words in the final list are chosen as the topical description of the input text. The user may determine the value of N.

Document searching and sorting may be accomplished by performing the method described above on each document in a database and then comparing the similarity of the resulting topical descriptions.

Alternate embodiments of the method described above include pre-filtering text to remove obvious stop words, representing lexical-collocations (i.e., words that normally appear together) as a single word, removing stutter phrases (i.e., duplicate words that appear in close proximity to one another, as often occur in speech), allowing the user to over-ride the language salience score for a particular word with a user-definable language salience score, constraining the collapsed tree list to include only the salient words from the text and the highest scoring definitional word from the highest point in the tree while ignoring lower scoring words in the tree even if these lower scoring words scored higher than words contained in other tree structures, allowing the input text to be in one language while the dictionary words are in another language and translating the resulting topic description into a third language, and allowing the term dictionary to include a dictionary, a thesaurus, an encyclopedia and/or other word-based relational databases.

Possible applications of the present invention include: smart human-computer interface for information retrieval (e.g., voice menu interface, reduce dialog in human-computer interaction, human-computer interface for system control, search engine for internet, automated routing of emergency services, interface for medical on-line diagnosis/data retrieval/consulting, interface for legal/financial information retrieval, etc.), document query (e.g., interface for medical on-line diagnosis/data retrieval/consulting, interface for legal/financial information retrieval, keyword indexing for document retrieval, locate portions of interest: within documents, etc.), automated data sorting (e.g., data routing, e-mail sorting, identification of redundant information in databases, etc.), natural language processing (e.g., disambiguate homonyms, stemming, part-of-speech tagging, etc.), post processing to improve machine transcription (e.g., machine recognition of speech, auto dictation, text conversion from an optical character reader, etc.), and multilingual processing (e.g., multi-lingual interface, automatic translation, etc.).

DETAILED DESCRIPTION

The present invention is a method of automatically generating a topic description for a document that may include words that do not appear in the document.

Figure 1:
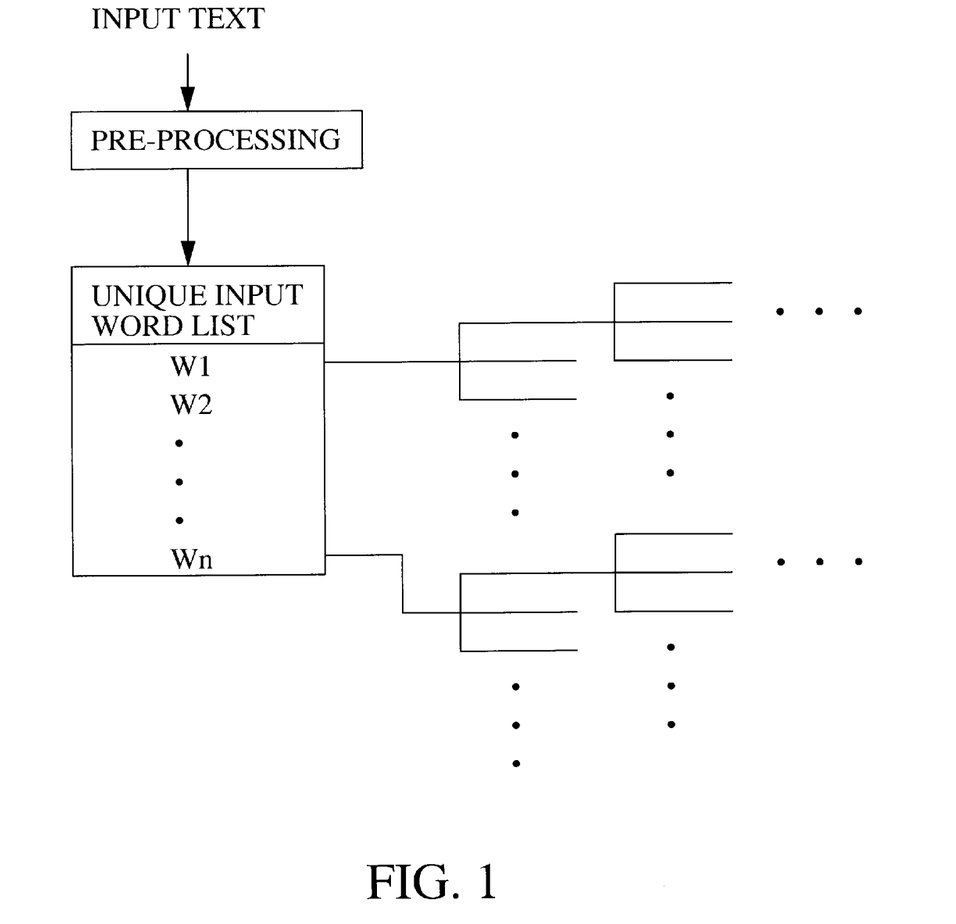
FIG. 1 is an illustration of the reception of input text and the tree structure expansion thereof.

FIG. 1 illustrates the receipt of an input document and the expansion thereof. The input document must be in text form, but the text may be derived from any form (e.g., speech, optical character reader, etc.). The text may be of any length, and may be in any language. After a topic description is generated for a number of documents, the present invention may be used to search for documents similar to a particular document or for sorting a number of documents.

After the text of a document is received, the text is pre-processed. That is, each word in the document is stemmed to its root form (i.e., singular noun form or verb infinitive form, etc.). Optional pre-processing steps include removing obvious stop words (i.e., words that carry no meaning related to the topic of the document such as the article "the"), treating lexical collocations (i.e., words that normally appear together) as one word, removing stutter phrases( i.e., phrases that are repeated within close proximity to the first utterance, such phrases frequently occurs in text based on speech), and so on.

Next, a list is made of each unique word $w_i$ in the input text. Each word in the input text is given an input-word score $A_{i,0}$. The input-word score for each word of the text is based on a number of other scores (i.e., $\beta_i$, $S_i$, m).

$\beta_i$ is a user-definable score based on the part-of-speech of word $w_i$. The value of $\beta_i$ indicates the likelihood of that part-of-speech being topical in nature. That is, proper nouns may be strongly topical, and nouns and verbs may be topical, but pronouns and interjections are, probably, non-topical. For example, weightings may range from those associated with proper nouns (e.g., 2.0) down to articles (e.g., 0.0).

$S_i$ is a language salience score for word $w_i$. The language salience score for each word may be determined from the frequency count $f_i$ of each word $w_i$ in a large corpus of text. For example, a user may wish to ignore words that occur too frequently because such words may have little topical significance. A user may wish to ignore words whose frequency of occurrence is greater than a frequency of occurrence that represents a point $f_{max}$, where the frequencies of occurrence are in rank order, and where the sum of frequencies of occurrence above the point equals the sum of frequencies of occurrence below the point. For example:

$S_i=0$, if $f_i>f_{max}$;

$S_i=\log(_{max}/(f_i-T^2+T))$, if $T^2<f_i<f_{max}$;

$S_i=\log(f_{max}/T)$, if $T<f_i<T^2$; and $S_i=\epsilon+((f_i/T)(\log(f_{max}/T)-\beta))$, if $f_i \leq T$, where $\epsilon$ and T are user-definable values.

The input-word score $A_{i,0}$ for each word in the document is a function of the part-of-speech score, the language salience score, and the number of times m the word appears in the text (e.g., $mS_i\beta_i$, $(S_i\hat{}m)\beta_i$, etc., where "^" denotes exponentiation).

Next, a tree structure is created for each unique word in the document. The tree structure contains words that represent the definition of the corresponding word, where the definition is pre-processed as was the input text. Each word in the tree structure may have connected to it a further tree structure containing the words representing the definitions of the corresponding dictionary words appearing in the previous level of the tree structure. The user may define the number of tree structure levels. To avoid potential problems, a recursively closed dictionary should be used to define the input text words and the words contained within a definition. A recursively closed dictionary is a dictionary where the root form of each word in a definition is also defined in the dictionary.

Each definition word in each tree structure level is assigned a definition-word score $A_{i,t}[j]$, where t indicates the tree structure level, based on its part-of-speech score $\beta_j$, the language salience score $S_i$ of the word it defines, a relational salience score $R_{i,j}$, and a user-definable factor W for setting the percentage of the language salience score of the word being defined that will be distributed amongst the definitional words in the tree structure (e.g., $A_{i,t}[j]=W(\beta_j,t)\Sigma A_{i,t-1}[k]R_{k,j}$), from 0 to k.

The relational salience $R_{i,j}$ score of a definitional word is a function of the dictionary salience score $D_j$ of the definitional word and the dictionary salience scores of the other words in the corresponding definition (e.g., $R_{i,j}=D_j/\Sigma D_k$, where k ranges over the definitional words of i). The dictionary salience score may be defined as $D_j=\beta_j(S_j\log(d_{max}/d_j))\hat{}0.5$, where $d_j$ is the number of dictionary terms that use the word $w_i$ in their definition, and where $d_{max}$ is the maximum value of d, (i.e., the number of dictionary terms that use the most frequently used dictionary term in the dictionary). For example, $w_i$ may be the word "jet," and it may be used in ten definitions. Therefore, $d_1=10$. Furthermore, $w_2$ may be the most frequently used word in the definitions in the dictionary, and $w_2$ may be used in 35,000 definitions. Therefore, $d_{max}=35,000$. The dictionary salience score may be over-ridden by a user-definable dictionary salience score. By setting a dictionary salience score to a sufficiently low value (e.g., 0.0), the user may effect a dictionary-based stop word list.

In an alternate embodiment, the dictionary salience score may be defined as $D_j=\beta_j(S_j\log(d_m/\Delta_j))\hat{}0.5$, where $\Delta d_j=\max(d_j, \epsilon)$ for small values of $\epsilon$ (e.g., $\epsilon=(d_{max})\hat{}0.25$, and $d_m$ is chosen such that a fixed percentage, e.g., 20%, of the observed values of the $d_j$'s are larger than $d_m$.

Figure 2:
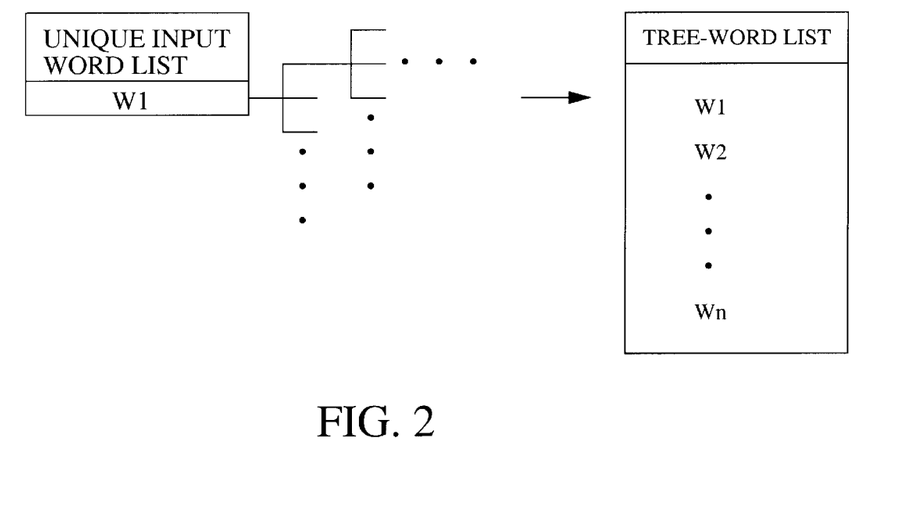
FIG. 2 is an illustration of tree structure compression into a word list for each input text word.

FIG. 2 illustrates how a tree structure corresponding to an input word is compressed into a single tree--word list, where the tree-word list for the corresponding input word contains each unique word of the input word and the definitional words in the tree structure. A tree-word list is similarly created for each word in the input text. Also, each word in each of the tree-word lists is assigned a tree-word list score $A_{i,tr}[j]$ that is a function of the scores of the multiple versions, of that word that may have existed in the corresponding uncollapsed tree structure. That is, if a word $w_j$ exists in various locations in a particular tree structure with a score $A_{i,t}[j]$ for each instance of the word in that particular tree structure then the corresponding tree-word list will include one instance of the word with a single tree-word list score $A_{i,tr}[j]$ that is based on the various scores recorded for the word in the corresponding uncollapsed tree structure (e.g., $A_{i,tr}[j]=\Sigma A_{i,t}[j]$). At this point each tree structure is processed independently of any other tree structure. That is, words that appear in different tree structures are not accounted for yet. They will be accounted for in the following step.

Figure 3:
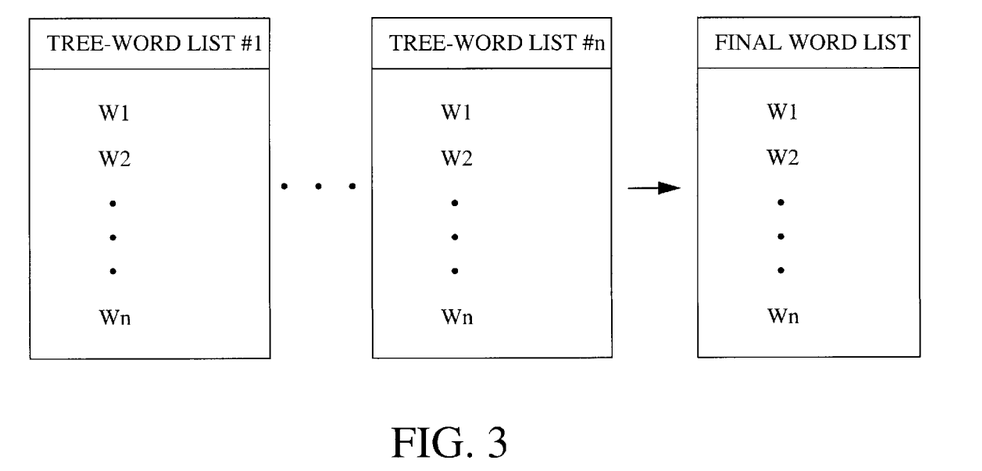
FIG. 3 is an illustration of word list compression for the word lists created by tree structure compression.

FIG. 3 illustrates how the tree-word lists created as in FIG. 2 are collapsed into a single final word list. Each unique word in the tree-word lists appears in the final word list. The words in the final word list are ranked in order according to a final word score $A_{fl}[j]$. The final word list may include words from the text and words from a definition. Each final word list entry is assigned a final word list score $A_{fl}[j]$ that is a function of the word's dictionary salience and its associated tree scores (e.g., $A_{fl}[j]=((D_j^{\wedge}(f(A_i[j]))) \Sigma A_i[j])$). For example, $A_{fl}=((D_j^{\wedge}(((1/p)\Sigma\phi_m[j])(\Sigma A_i[j])))$, where $\phi_m[j]= ((n[j\ ])(((1+((-1)^{\wedge}p))/2)-((1/max(A_i[j]))(\Sigma((\Sigma(-A_i[j])A_i[j])^{\wedge}(x-1))))))$.

The top N scoring words in the final word list are returned as the topic description of the input document, where N may be defined by the user (e.g., N=20).

Figure 4:
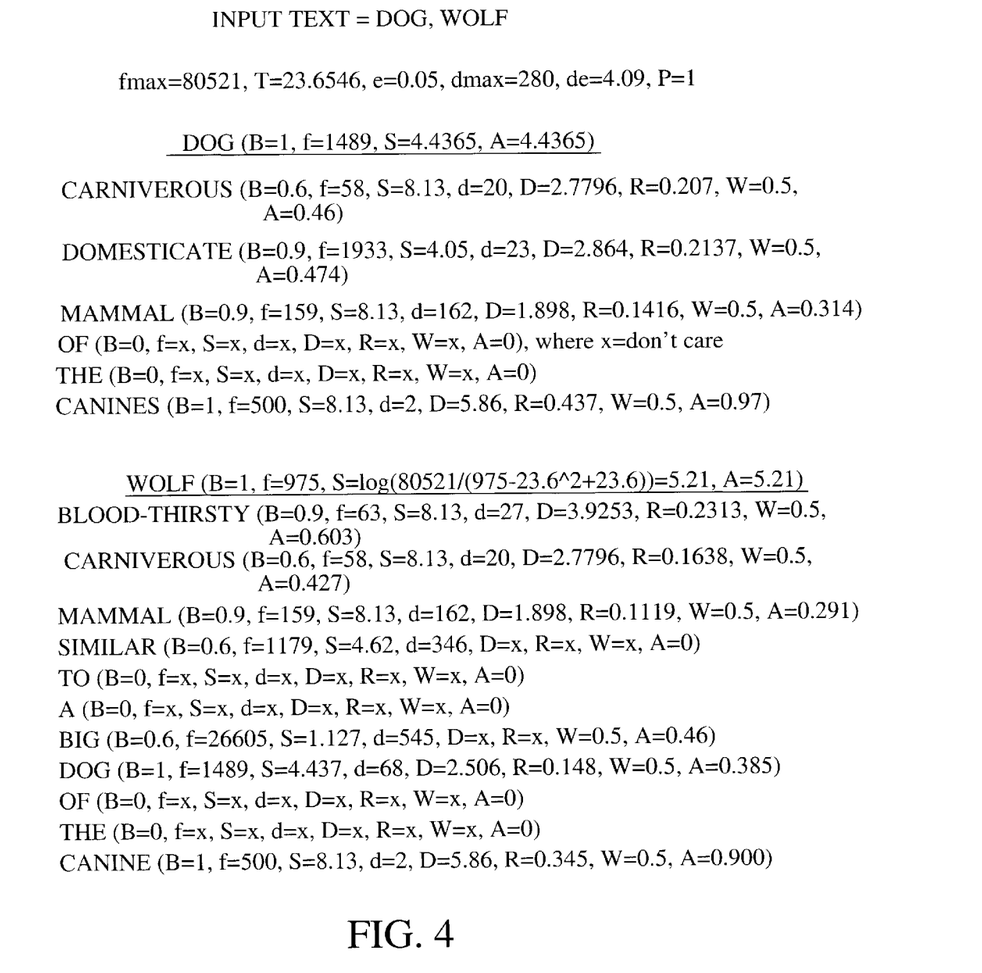
FIG. 4 is an example of an input word list and its associated tree structures, input-word scores and definition-word scores.

FIG. 4 is an example of an input-word list (i.e., dog, wolf) and its associated tree structures. The example is constrained so that a collapsed tree list includes only the salient words from the text and the highest scoring definitional word from the highest point in the tree while ignoring lower scoring words in the tree even if these lower scoring words scored higher than words contained in other tree structures. In other words, word that are not multiply-accessed at the highest level in the tree structure are pruned from the tree structure. The constants for the example are $f_{max}$=80,521; T=23.6546, $\epsilon$(or e)=0.05; $d_{max}$=280, and $d_\epsilon$(or $d_e$)=4.09, and P=1. Associated with the input word dog are the following values: dog, $\beta$(or B)=1, f=1489, S=4.4365, and A=4.4365.

The input-word dog is defined by the definition carnivorous domesticate mammal of the canines. Associated with these definitional words are the following values: carnivorous, $\beta$=0.6, f=58, S=8.13, d=20, D=2.7796, R=0.207, W=0.5, and A=0.46; domesticate, $\beta$=0.9, f=1933, S=4.05, d=23, D=2.864, R=0.2137, W=0.5, and A=0.474; mammal, $\beta$=0.9, f1933, 159, S=8.13, d=162, D=1.898, R=0.1416, W=0.5, and A=0.314; of, $\beta$=0, f=x, where x denotes "don't care" or any value, S=x, d=x, D=x, R=x, W=x, and A=0; the, $\beta$=0, f=x, S=x, d=x, D=x, R=x, W=x, and A=0; and canine, $\beta$=1, f=500, S=8.13, d=2, D=5.86, R=0.437, W=0.5, and A=0.97.

The input-word wolf is defined by the definition blood-thirsty carnivorous mammal similar to a big dog of the canine. Associated with these definitional words are the following values: blood-thirsty, $\beta$=0.9, f=63, S=8.13, d=,27, D=3.9253, R=0.2313, W=0.5, and A=0.603; carnivorous, $\beta$=0.6, f=58, S=8.13, d=20, D=2.7796, R=0.1638, W=0.5, and A=0.427; mammal, $\beta$=0.9, f=159, S=8.13, d=162, D=1.898, R=0.1119, W=0.5,. and A=0.291; similar, $\beta$=0.6, f=1179, S=4.62, d=346, D=x, R=x, W=x, and A=0; to, $\beta$=0, f=x, S=x, d=x, D=x, R=x, W=x, and A=0; a, $\beta$=0, f=x, S=x, d=x, D=x, R=x, W=x, and A=0; big, $\beta$=0.6, f=26605, S=1.127, d=545, D=x, R=x, W=0.5, and A=0.46; dog, $\beta$=1, f=1489, S=4.437, d=68, D=2.506, R=0.148, W=0.5, and A=0.385; of, $\beta$=0, f=x, S=x, d=x, D=x, R=x, W=x, and A=0; the, $\beta$=0, f=x, S=x, d=x, D=x, R=x, W=x, and A=0; and canine, $\beta$=1, f=500, S=8.13, d=2, D=5.86, R=0.345, W=0.5, and A=0.9.

Note that carnivorous, mammal, of, the, and canine appears in both of the tree structures of the example. Redundancy between tree structures will be accounted for when the tree-word lists are compressed into one final word list.

Figure 5:
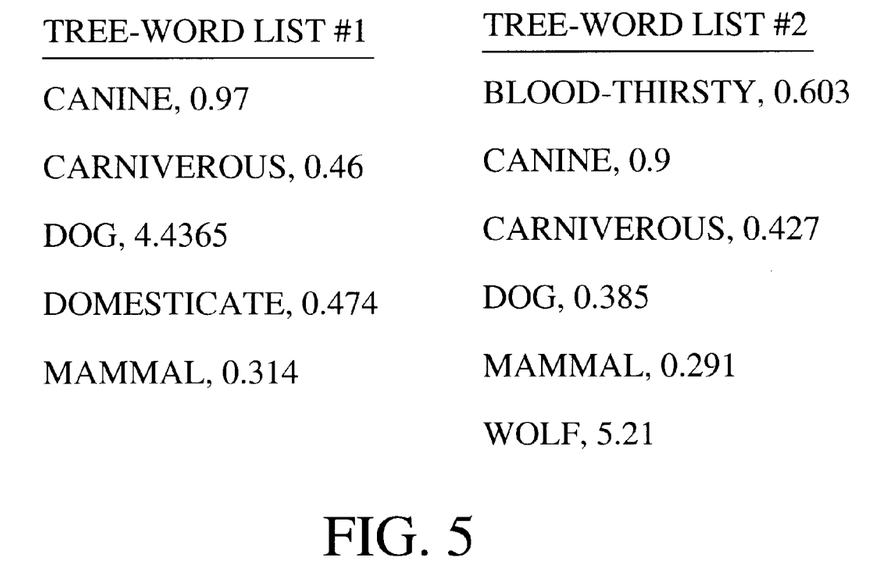
FIG. 5 is an example of the tree word lists and tree word list scores for the example of FIG. 5.

FIG. 5 illustrates the result of compressing the tree structures of FIG. 4 into corresponding tree-word lists. The tree structure associated with input word dog is compressed to the following tree-word list with the associated tree-word list scores: canine, 0.97; carnivorous, 0.46; dog, 4.4365; domesticate, 0.474; and mammal, 0.314. The tree structure associated with input word wolf is compressed to the following tree-word list with the associated tree-word list scores: blood-thirsty, 0.603; canine, 0.9; carnivorous, 0.427; dog, 0.385; mammal, 0.291, and wolf, 5.21.

Figure 6:
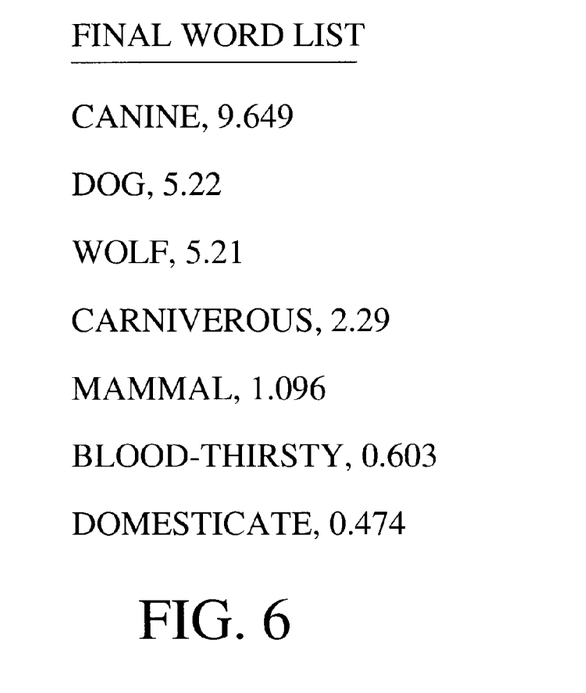
FIG. 6 is an example of the final word list and final word list scores for the example of FIG. 5.

FIG. 6 illustrates how the two tree-word lists of FIG. 5 are compressed into a single final word that lists the final words in rank order according to the corresponding final-word-list scores which are included. The final word list contains the following words and scores in rank order: canine, 9.649; dog, 5.22; wolf, 5.21; carnivorous, 2.29; mammal, 1.096; blood-thirsty, 0.603; and domesticate, 0.474. The words blood-thirsty and domesticate are pruned from the list because they are not multiply accessed at the highest level of their tree structure. The user may define the number of words that will be used to describe the topic of the input text. For example, if the user chooses the number three, the top three scoring words (e.g., canine, dog, wolf) on the final word list will be returned as the description of the topic of the corresponding input text (i.e., dog, wolf). Note that the first word in the topical description the example of FIG. 4 (i.e., canine) did not appear in the input text (i.e., dog, wolf).

Document searching and sorting may be accomplished by performing the method described above on each document in a database and then comparing the similarity of the resulting topical descriptions.

In alternate embodiments of the present invention, a user may over-ride the language salience score for a particular word with a user-definable language salience score, and may constrain the tree-word lists to include only the salient words from the input text and the highest scoring definitional word from the highest point in the tree, while ignoring lower scoring words in the tree even if these lower scoring words scored higher than words contained in other tree structures. What the last alternate embodiment means is that each tree structure consists of an input word, parent definitional words (i.e., words that define the input word), and child definitional words (i.e., words that define a definitional word). The child definitional words that do not appear in more than one tree structure will be pruned from the tree structure. Also, child definitional words that appear in more than one tree structure that have the same parent definitional word will be pruned from the tree structure.

What is claimed is:

1. A method of automatically generating a topical description of text, comprising the steps of:

a) receiving the text, where the text consists of one or more input words;

b) stemming each input word to its root form;

c) assigning a user-definable part-of-speech score $\beta_i$ to each input word;

d) assigning a language salience score $S_i$ to each input word;

e) assigning an input-word score to each input word that is a function of the corresponding input word's part-of-speech score $\beta_i$, language salience score $S_i$, and the number of times the corresponding input word appears in the text;

f) creating a tree structure under each input word, where each tree structure contains the definition of the corresponding input word, where each definition word may be further defined to a user-definable number of levels;

g) assigning a definition-word score $A_{i,t}[j]$ to each definition word in each tree structure based on the definition word's part-of-speech score $\beta_j$, the language salience score of the word the definition word defines, a relational salience score $R_{k,j}$, and a user-definable factor W;

h) collapsing each tree structure to a corresponding tree-word list, where each tree-word list contains the unique words contained in the corresponding tree structure;

i) assigning a tree-word-list score to each word in each tree-word list, where each tree-word-list score is a function of the scores of the corresponding word that existed in the corresponding uncollapsed tree structure;

j) combining the tree-word lists into a final word list, where the final word list contains the unique words contained in the tree-word lists;

k) assigning a final-word-list score $A_{fl}[j]$ to each word in the final word list, where $A_{fl}[j]$ is a function of the corresponding word's dictionary salience and tree-word-list scores; and l) choosing the top N scoring words in the final word list as the topic description of the input text, where the value N may be defined by the user.

2. The method of claim 1, wherein said step of receiving the text, is comprised of the step of receiving text wherein said text is selected from the group consisting of speech-based text, optical-character-read text, stop-word-filtered text, stutter-phrase-filtered text, and lexical-collocation-filtered text.

3. The method of claim 1, wherein said step of assigning a language salience score $S_i$ to each input word is comprised of the step of determining the language salience score for each input word from the frequency count $f_i$ of each word in a large corpus of text as follows:

$S_i=0$, if $f_i > f_{max}$;

$S_i=\log(f_{max}/(f_i-T^2+T))$, if $T^2 < f_i < f_{max}$;

$S_i=\log(f_{max}/T)$, if $T < f_i < T^2$; and $S_i=\epsilon+((f_i/T)(\log(f_{max}/T)-\epsilon))$, if $f_i \leq T$, where $\epsilon$ and T are user-definable values, and where $f_{max}$ represents a point where the sum of frequencies of occurrence above the point equals the sum of frequencies of occurrence below the point.

4. The method of claim 3, wherein said step of assigning a language salience score $S_i$ to each input word further comprises the step of allowing the user to over-ride the language salience score for a particular word with a user-definable language salience score.

5. The method of claim 1, wherein said step of assigning an input-word score to each input word is comprised of the step of assigning an input-word score where said input-word score is selecting from the group consisting of $mS_i\beta_i$ and $(S_i\hat{}m)\beta_i$, where m is the number of times the corresponding input word occurs in the text.

6. The method of claim 1, wherein said step of creating a tree structure under each input word is comprised of creating a tree structure under each input word using a recursively closed dictionary.

7. The method of claim 1, wherein said step of creating a tree structure under each input word is comprised of creating a tree structure under each input word using a database selected from a group consisting of a thesaurus, an encyclopedia, and a word-based relational database.

8. The method of claim 1, wherein said step of creating a tree structure under each input word is comprised of creating a tree structure under each input word using a recursively closed dictionary that is in a different language than the text.

9. The method of claim 1, wherein said step of assigning a definition-word score to each definition word in each tree structure is comprised of assigning a definition-word score to each definition word as follows: $A_{i,t}[j]=W(\beta_j,t)\Sigma A_{i,t-1}[k] R_{k,j}$, where $R_{i,j}=D_j/\Sigma D_k$), where $\Sigma D_k$ represents the sum of the dictionary saliences of the words in the definition of word $w_i$, where $D_j=\beta_j(S_j\log(d_{max}/d_j))\hat{}0.5$, where $d_t$ is the number of dictionary terms that use the corresponding word in its definition, and where $d_{max}$ is the number of times the most frequently used word in the dictionary is used.

10. The method of claim 1, wherein said step of assigning a definition-word score to each definition word in each tree structure is comprised of assigning a definition-word score to each definition word as follows: $A_{i,t}[j]=W(\beta_j,t)\Sigma A_{i,t-1}[k] R_{k,j}$, where $R_{i,j}=D_j/\Sigma D_k$), where $\Sigma D_k$ represents the sum of the dictionary saliences of the words in the definition of word $w_i$, where $D_j=\beta_j(S_j\log(d_m/\Delta_j))\hat{}0.5$, where $\Delta_j=\max(d_j, \epsilon)$, and $d_m$ is chosen such that a fixed percentage of the observed values of the $d_j$'s are larger than $d_m$.

11. The method of claim 1, wherein said step of assigning a definition-word score is comprised of the step of assigning a score to each definition word that is user-definable.

12. The method of claim 1, wherein said step of collapsing each tree structure is comprised of collapsing each tree structure to a corresponding tree-word list, where each tree-word list contains only salient input words and definition words in a particular tree structure having the highest score while ignoring lower scoring definition words in that tree structure even if the lower scoring definition words score higher than definition words contained in other tree structures.

13. The method of claim 1, wherein said step of assigning a tree-word-list score to each word in each tree-word list is comprised of assigning a tree-word-list score that is the sum of the scores associated with the word in its corresponding tree structure.

14. The method of claim 1, wherein said step of assigning a final word list score is comprised of the step of assigning a final word list score according to the following equation $A_{fl}[j]=((D_j\hat{}(f(A_s[j])))\Sigma A_s[j])$.

15. The method of claim 1, further comprising the step of translating the topic description into a language different from the input text and the language of the dictionary.

16. The method of claim 1, further comprising the steps of:

a) receiving a plurality of documents, where one of said plurality of documents is identified as the document of interest;

b) determining a topic description for each of said plurality of documents;

c) comparing the topic descriptions of each of said plurality of documents to the topic description of said document of interest; and d) returning each of said plurality of documents that has a topic description that is sufficiently similar to the topic description of said document of interest.

17. The method of claim 1, further comprising the steps of:

a) receiving a plurality of documents;

b) determining a topic description for each of said plurality of documents;

c) comparing the topic descriptions of each of said plurality of documents to each other of said plurality of documents; and d) sorting said plurality of documents by topic description.

18. The method of claim 2, wherein said step of assigning a language salience score $S_i$ to each input word is comprised of the step of determining the language salience score for each input word from the frequency count $f_i$ of each word in a large corpus of text as follows:

$$S_i=0, \text{ if } f_i > f_{max};$$

$$S_i=\log (f_{max}/(f_i-T^2+T)), \text{ if } T^2 < f_i < f_{max};$$

$$S_i=\log (f_{max}/T), \text{ if } T < f_i < T^2; \text{and}$$

$$S_i=\epsilon+((f_i/T)(\log(f_{max}/T)-\epsilon)), \text{ if } f_i \leq T,$$

where $\epsilon$ and T are user-definable values, and where $f_{max}$ represents a point where the sum of frequencies of occurrence above the point equals the sum of frequencies of occurrence below the point.

19. The method of claim 18, wherein said step of assigning a language salience score $S_i$ to each input word further comprises the step of allowing the user to over-ride the language salience score for a particular word with a user-definable language salience score.

20. The method of claim 19, wherein said step of assigning an input-word score to each input word is comprised of the step of assigning an input-word score where said input-word score is selecting from the group consisting of $mS_i\beta_i$ and $(S_i{}^\wedge m)\beta_i$, where m is the number of times the corresponding input word occurs in the text.

21. The method of claim 20, wherein said step of creating a tree structure under each input word is comprised of creating a tree structure under each input word using a recursively closed dictionary.

22. The method of claim 21, wherein said step of creating a tree structure under each input word is comprised of creating a tree structure under each input word using a recursively closed dictionary that is in a different language than the text.

23. The method of claim 22, wherein said step of assigning a definition-word score to each definition word in each tree structure is comprised of assigning a definition-word score to each definition word as follows: $A_{i,t}[j]=W(\beta_j, t)\Sigma A_{i, t-1}[k]R_{k,j}$, where $R_{i,j}=D_j/\Sigma D_k$, where $\Sigma D_k$ represents the sum of the dictionary saliences of the words in the definition of word $w_i$, where $D_j=\beta_j(S_j\log(d_{max}/d_j))^\wedge 0.5$, where $d_t$ is the number of dictionary terms that use the corresponding word in its definition, and where $d_{max}$ is the number of times the most frequently used word in the dictionary is used.

24. The method of claim 23, wherein said step of assigning a definition-word score to each definition word in each tree structure is comprised of assigning a definition-word score to each definition word as follows: $A_{i,t}[j]=W(\beta_j,t)\Sigma A_{i, t-1}[k]R_{k,j}$, where $R_{i,j}=D_j/\Sigma D_k$, where $\Sigma D_k$ represents the sum of the dictionary saliences of the words in the definition of word $w_i$, where $D_j=\beta_j(S_j\log (d_m/\Delta_j))^\wedge 0.5$, where $\Delta_j=\max (d_j, \epsilon)$, and $d_m$ is chosen such that a fixed percentage of the observed values of the $d_j$'s are larger than $d_m$.

25. The method of claim 24, wherein said step of assigning a definition-word score is comprised of the step of assigning a score to each definition word that is user-definable.

26. The method of claim 25, wherein said step of collapsing each tree structure is comprised of collapsing each tree structure to a corresponding tree-word list, where each tree-word list contains only salient input words and definition words in a particular tree structure having the highest score while ignoring lower scoring definition words in that tree structure even if the lower scoring definition words score higher than definition words contained in other tree structures.

27. The method of claim 26, wherein said step of assigning a tree-word-list score to each word in each tree-word list is comprised of assigning a tree-word-list score that is the sum of the scores associated with the word in its corresponding tree structure.

28. The method of claim 27, wherein said step of assigning a final word list score is comprised of the step of assigning a final word list score according to the following equation $$A_{fi}[j]=((D_j\hat{\ }(f(A_i[j])))\Sigma A_i[j]).$$

29. The method of claim 28, further comprising the step of translating the topic description into a language different from the input text and the language of the dictionary.

30. The method of claim 29, further comprising the steps of:

a) receiving a plurality of documents, where one of said plurality of documents is identified as the document of interest;

b) determining a topic description for each of said plurality of documents;

c) comparing the topic descriptions of each of said plurality of documents to the topic description of said document of interest; and d) returning each of said plurality of documents that has a topic description that is sufficiently similar to the topic description of said document of interest.

31. The method of claim 30, further comprising the steps of:

a) receiving a plurality of documents;

b) determining a topic description for each of said plurality of documents;

c) comparing the topic descriptions of each of said plurality of documents to each other of said plurality of documents; and d) sorting said plurality of documents by topic description.

* * * * *